US009928058B1

(12) United States Patent
Beranek et al.

(10) Patent No.: US 9,928,058 B1
(45) Date of Patent: Mar. 27, 2018

(54) OPTIMIZED CLASS LOADING

(71) Applicant: Amazon Technologies, Inc., Seattle, WA (US)

(72) Inventors: Kevin Michael Beranek, Seattle, WA (US); Keian Christopher, Seattle, WA (US); Vijay Ravindra Kulkarni, Seattle, WA (US); Samuel Leonard Moniz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 14/526,195

(22) Filed: Oct. 28, 2014

(51) Int. Cl.
  *G06F 9/445* (2006.01)
  *G06F 9/44* (2018.01)
(52) U.S. Cl.
  CPC ............ *G06F 8/70* (2013.01); *G06F 9/44521* (2013.01)
(58) Field of Classification Search
  CPC ............................... G06F 8/70; G06F 9/44521
  USPC ........................................................ 717/166
  See application file for complete search history.

(56) References Cited

U.S. PATENT DOCUMENTS

| 6,542,887 | B1* | 4/2003 | Abbott | |
| 7,707,166 | B1* | 4/2010 | Patterson | 707/999.206 |
| 9,348,857 | B2* | 5/2016 | Glover | G06F 17/30336 |
| 2003/0177484 | A1* | 9/2003 | Bosschaert | G06F 9/44552 717/166 |
| 2007/0006203 | A1* | 1/2007 | Marwinski | 717/166 |
| 2007/0198974 | A1* | 8/2007 | Branda et al. | 717/166 |
| 2008/0271002 | A1* | 10/2008 | Susarla et al. | 717/148 |
| 2012/0197851 | A1* | 8/2012 | Leppard | 707/692 |
| 2013/0132408 | A1* | 5/2013 | Little | 707/754 |
| 2014/0244779 | A1* | 8/2014 | Roitshtein et al. | 709/213 |
| 2014/0280342 | A1* | 9/2014 | Litherland et al. | 707/780 |
| 2014/0351802 | A1* | 11/2014 | Elias | G06F 8/70 717/166 |

FOREIGN PATENT DOCUMENTS

EP          0911728       * 10/1998

OTHER PUBLICATIONS

Web Article: "Bloom Filter" published by Wikipedia [online][retrieved on Oct. 28, 2014] retrieved from http://en.wikipedia.org/wiki/Bloom_filter , 17 pps.

(Continued)

*Primary Examiner* — Camquy Truong
(74) *Attorney, Agent, or Firm* — Lee & Hayes, PLLC

(57) ABSTRACT

A classloader executing in an execution environment, such as a JAVA virtual machine or a software container, may be configured to generate class usage data describing the historical usage of classes by applications in the execution environment. Based upon the class usage data, one or more classes may be pre-loaded into a cache prior to receiving a request from an application to load the classes. If an application subsequently requests a class, the request may be satisfied using the class stored in the cache rather than by loading the class at the time the request is received. A probabilistic data structure, such as a Bloom filter, might also be utilized to determine whether a classloader can possibly load a requested class. Only if the classloader can possibly load the requested class will a search be made for the requested class in a classpath associated with the classloader.

18 Claims, 8 Drawing Sheets

(56) References Cited

OTHER PUBLICATIONS

Web Article: "Java Classloader" published by Wikipedia [online][retrieved on Oct. 28, 2014] retrieved from http://en.wikipedia.org/wiki/Java_Classloader , 4 pps.

Webpage: "adaptive readahead daemon" published by Ubuntu [online][retrieved on Oct. 28, 2014] retrieved from http://apps.ubuntu.com/cat/applications/preload/ , 1 page.

Webpage: "Raw Computing" published by Linux [online][retrieved on Oct. 28, 2014] retrieved from http://www.rawcomputing.co.uk/linux/linuxtips55.html , 1 page.

Fan, B. "Cuckoo Filter: Practically Better Than Bloom" published by Carnegie Mellon University, 2014 [online][retrieved on Oct. 28, 2014] retrieved from https://www.cs.cmu.edu/~dga/papers/cuckoo-conext2014.pdt , 13 pps.

* cited by examiner

OPTIMIZED CLASS LOADING

BACKGROUND

Various types of execution environments may be utilized to execute applications. Software containers, for example, are one type of execution environment for applications (which might also be referred to herein as "tenants"). Software containers can provide functionality for executing applications, loading application dependencies, interconnecting applications at run time, managing application lifecycles including integrated application deployment and eviction, multi-tenant execution, and other types of functionality.

Applications executing in a software container typically utilize one or more classloaders in order to load needed classes. Classloaders load requested classes on-demand, as the classes are needed by an application. On-demand loading of classes can, however, cause performance problems in certain types of scenarios. For example, when live network traffic is received at a software container for processing by an application, it may be necessary to load certain classes in order to enable the application to process the traffic. The loading of classes needed by the application at or around the time the traffic is received might impose significantly latency on the processing of the network traffic. Other factors might also contribute to less than optimal performance of classloaders in various types of execution environments.

It is with respect to these and other considerations that the disclosure made herein is presented.

DETAILED DESCRIPTION

Figure 1:
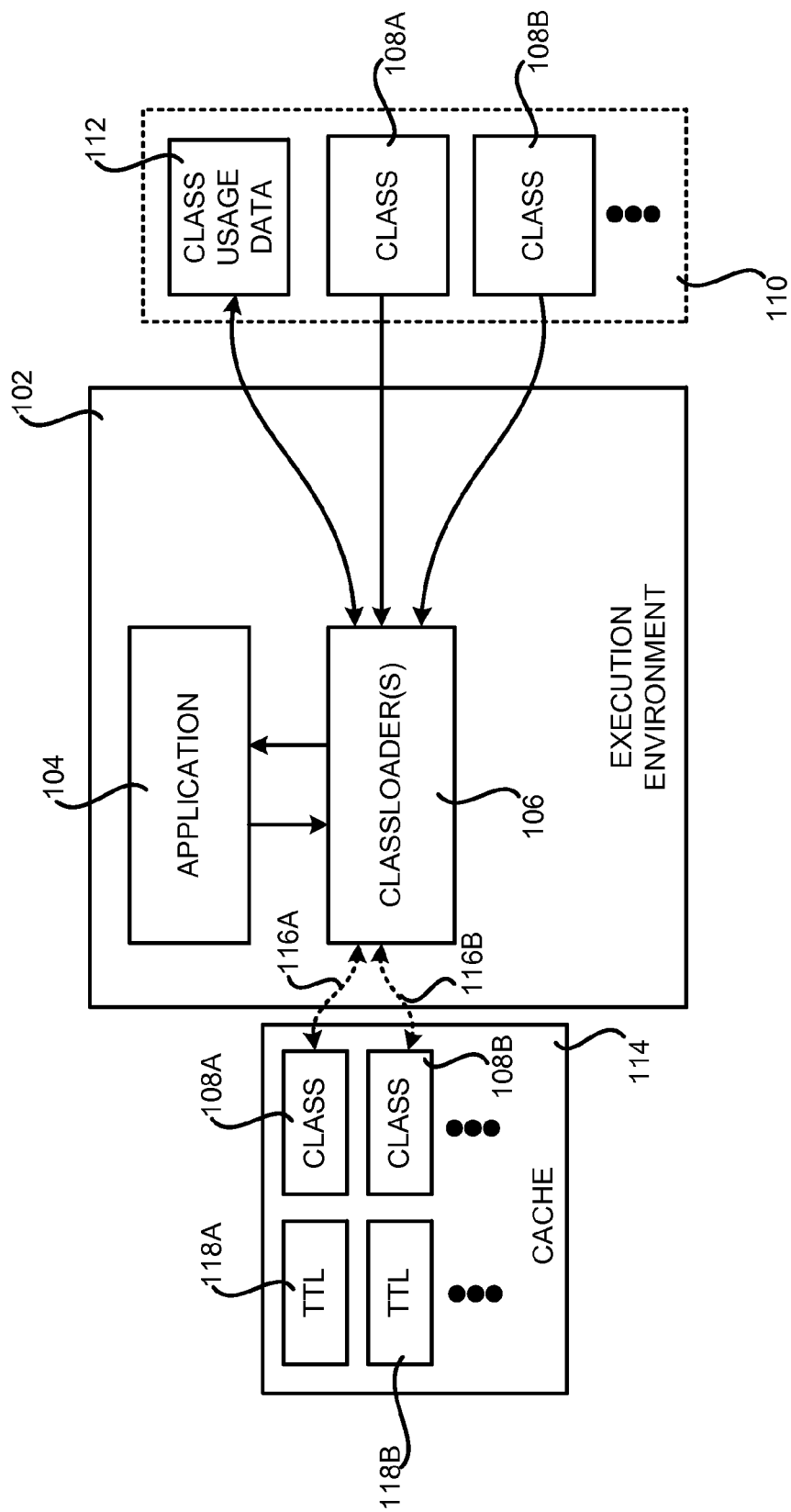
FIG. 1 is a software architecture diagram showing aspects of the configuration and operation of one mechanism disclosed herein for pre-loading of classes.

The following detailed description is directed to technologies for optimized class loading. In particular, mechanisms are disclosed herein for pre-loading classes into a cache prior to receiving a request for the classes. Mechanisms are also described herein for optimized loading of classes utilizing a probabilistic data structure, such as a Bloom filter.

As discussed briefly above, the mechanisms disclosed herein might be utilized in conjunction with various types of execution environments for applications. One particular type of execution environment is a JAVA virtual machine ("JVM"). Another type of execution environment within which the technologies disclosed herein might be utilized is a software container (which might also be called a "Web container", "an application container", or a "servlet container").

As discussed briefly above, a software container can provide functionality for executing applications, loading application dependencies, interconnecting applications at run time, for managing application lifecycles, including integrated application deployment and eviction, and other types of functionality. A multi-tenant software container is a software container configured to execute applications in process on behalf of two or more tenants. A software container may be implemented using a JVM or other technologies. It should be appreciated that while the technologies disclosed herein are primarily presented in the context of JVMs and software containers, the technologies disclosed herein might also be utilized with other types of execution environments, including other types of containers.

As also discussed briefly above, applications executing in various types of execution environments, such as JVMs and software containers, typically utilize one or more classloaders in order to load needed classes. Classloaders load requested classes on-demand, as the classes are needed by an application. On-demand loading of classes can, however, cause performance problems in certain types of scenarios. For example, and as described above, when live network traffic is received at a software container for processing by an application, it may be necessary to load certain classes in order to enable the application to process the traffic. The loading of classes needed by the application at or around the time the traffic is received might impose significantly latency on the processing of the network traffic.

In order to address the considerations set forth above, and potentially others, the technologies disclosed herein include a mechanism for pre-loading classes into a cache prior to receiving a request for the classes from an application. Other types of pre-processing might also be performed on the classes at or around the time they are loaded into the cache such as, but not limited to, bytecode weaving of a class and/or defining a loaded class so that the loaded class is available to requesting applications.

In order to identify classes that are to be pre-loaded, class usage data may be created that describes the historical usage of classes. The class usage data may be utilized to select classes for pre-loading into the cache. When a request to load a class is received at a classloader to load a class, the request will be satisfied from pre-loaded classes already in the cache when possible. In this way, the time required to make requested classes available to applications may be reduced as compared to previous solutions that load classes only in response to demand from applications. Additional details regarding the mechanisms disclosed herein for pre-loading and pre-processing of classes will be provided below with regard to FIGS. 1-5.

In order to address the considerations set forth above, and potentially others, the technologies disclosed herein also include a mechanism for loading of classes utilizing a probabilistic data structure ("PDS"), such as a Bloom filter. In particular, a PDS can be associated with a classloader that stores data indicating whether the classloader cannot load certain classes and indicating that there is a possibility that the classloader can load certain other classes. When the classloader receives a request to load a class, the classloader may utilize the PDS to determine whether there is a possibility that the classloader can load the requested class.

If there is a possibility that the classloader can load the requested class it will search its associated classpath for the requested class. No search will be made of the classpath if there is no possibility that the classloader can load the requested class. The classloader will load the requested class into memory if it locates the requested class in its classpath. If the PDS indicates that the classloader cannot load the requested class or if the class is not found in the classloader's classpath, the classloader might delegate the loading of the class to a second classloader that is similarly configured to utilize an associated PDS in the manner described above.

In some configurations, the PDS is pre-generated prior to receiving requests to load classes by searching the classpath of a classloader to identify the classes that the classloader can load. In other configurations, the PDS might be generated as requests to load classes are received and searches are made of the classloader's classpath for the requested classes. Additionally, in some configurations, each PDS might have an associated false positive probability. In configurations where a hierarchy of classloaders is utilized, the PDS utilized at each level of the hierarchy might be generated to provide different false positive probabilities. For example, a classloader at the top of the hierarchy might have a specified false positive probability of 10%. A classloader at a lower level of the hierarchy might have lower false positive probability, such as 1%. Other configurations might also be utilized.

In other configurations, a PDS associated with a classloader might also include data indicating whether there is a possibility that one or more parent or child classloaders can load certain classes. In such a configuration, a request to load a class might only be delegated to a parent or child classloader if the PDS indicates that there is some possibility that a parent or child classloader can load the class. In this way, delegation might be avoided if there is no possibility that a parent or child classloader can load a requested class. Additional details regarding the mechanisms disclosed herein for optimized loading of classes using a probabilistic data structure will be provided below with regard to FIGS. 6 and 7.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, hand-held computers, personal digital assistants, cellular telephone devices, electronic-book readers, special-purposed hardware devices, network appliances, and the like. The technologies described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures.

FIG. 1 is a software architecture diagram showing aspects of the configuration and operation of one mechanism disclosed herein for pre-loading of classes. As shown in FIG. 1, an execution environment 102 provides an operating environment for the technologies disclosed herein. As discussed briefly above, one particular type of execution environment 102 with which the technologies disclosed herein may be utilized is a JVM. Another type of execution environment 102 within which the technologies disclosed herein might be implemented is a software container.

As also discussed briefly above, a software container can provide functionality for executing applications, such as the application 104, loading application 104 dependencies, interconnecting applications 104 at run time, for managing application 104 lifecycles, including integrated application 104 deployment and eviction, and other types of functionality. A multi-tenant software container is a software container configured to execute applications 104 in process on behalf of two or more tenants. A software container may be implemented using a JVM or other technologies. It should be appreciated that while the technologies disclosed herein are primarily presented in the context of JVMs and software containers, the technologies disclosed herein might also be utilized with applications 104 executing in other types of execution environments 102, including other types of containers.

It should be appreciated that software containers are available for use in many development and execution environments. For example, software containers are commonly available that utilize the JAVA programming language from ORACLE CORPORATION. Examples of software containers include, but are not limited to WEBSPHERE from IBM CORPORATION, SPRING FRAMEWORK from VMWARE CORPORATION, GUICE from GOOGLE CORPORATION, the PICOCONTAINER and PLEXUS projects from CODEHAUS, the FELIX, TOMCAT, TOMEE and GERONIMO projects from the APACHE SOFTWARE FOUNDATION, EQUINOX, GEMINI, JETTY and ECLIPSE from the ECLIPSE FOUNDATION, JBOSS from REDHAT CORPORATION, and GLASSFISH, WEBLOGIC, and FUSION from ORACLE CORPORATION. Although the technologies disclosed herein are primarily presented in the context of JVMs and software containers, the technologies disclosed herein might also be utilized with other types of containers and with other types of execution environments 102.

As also discussed briefly above, applications 104 executing in various types of execution environments 102, such as JVMs and software containers, typically utilize one or more classloaders 106 in order to load needed classes 108. Classloaders 106 typically load requested classes 108 on-demand, as the classes 108 are needed by an application 104. The classes 108 may be loaded from an external location 110, such as on a local file system of a computer providing the execution environment 102, a network share, or another location. It should be appreciated that classloaders 106 may also load other types of resources, including non-class data such as configuration files. As used herein, the term "class" is intended to encompass all of the classes and non-class data that may be loaded by a classloader 106.

As discussed briefly above, the time required to load a class 108 from an external location 110 and make the class 108 available for use by an application 104 can impose latency on the amount of time required for the application 104 to process network traffic and/or for the execution environment 102 to become ready to process requests. In order to address at least some the considerations set forth above, and potentially others, the technologies disclosed herein include a mechanism for pre-loading classes 108 into a cache 114, such as a cache located in random access memory ("RAM" or "memory"), prior to receiving a request for a class 108 from an application 104. For instance, in the configuration shown in FIG. 1, the classloader 106 might load the class 108A and/or the class 108B into the cache 114 prior to receiving a request for either of the classes 108A and 108B from the application 104. When the application 104 actually requests either or both of the classes 108A and 108B from the classloader 106, the request can be satisfied from the cache 114 rather than by loading the classes 108A and 108B from the external location 110. It should be appreciated that the cache 114 might be located in the RAM of a computer executing the execution environment 102 or in the RAM of another network connected computer. The cache 114 might also be stored on disk of the computer executing the execution environment 102 or in any other location that provides faster access to its contents than the external location 110.

In order to determine which classes 108 to pre-load, the classloader 106, or another component in some configurations, may store class usage data 112 that describes the historical usage of classes 108 by applications 104 executing in the execution environment 102. The class usage data 112 may be maintained on a per computer basis or across multiple execution environments 102 executing on multiple computers. The class usage data 112 might also describe the usage of the classes 108 by multiple applications 104. The class usage data 112 might identify classes 108 that have been loaded by an application 104, the frequency at which the classes 108 were loaded, the order in which the classes 108 were loaded, any dependencies between classes 108, the computational cost or resource cost of loading the classes 108, and/or data indicating a cache mis-prediction rate for the one or more classes (e.g. data identifying classes 108 that were pre-loaded into the cache 114 but not requested or infrequently requested). The class usage data 112 might also include other types of data describing other aspects of the historical usage of the classes 108 by applications 104 executing in the execution environment 102. As will be described in detail below, the class usage data 112 might be generated over time as classes 108 are requested by applications 104 executing in the execution environment 102 and utilized to pre-load classes 108 prior to receiving a request for the classes 108 from an application 104.

It should be appreciated that the class usage data 112 might become out of date when the application 104 and/or the classes 108 are updated. In order to ensure that the class usage data 112 remains useful in predicting when certain classes 108 will be requested, new versions of the application 104 and/or the classes 108 might be analyzed to determine whether previously utilized classes 108 are still utilized. For example, and without limitation, an older version of the application 104 and a newer version of the application 104 might be compared in order to determine whether the newer version of the application 104 utilizes the same classes 108 as the older version. The class usage data 112 might then be updated based upon the results of this analysis. For instance, if the newer version of the application 104 no longer utilizes certain classes 108, the class usage data 112 might be updated so that the unused classes are no longer pre-loaded into the cache 114. In this regard, it should be appreciated that an analysis of the application 104 might also be performed in order to initially generate the class usage data 112. Other mechanisms might also be utilized in order to generate and/or update the class usage data 112.

Once the class usage data 112 has been generated, the classloader 106 might utilize the class usage data 112 to identify classes 108 that are to be pre-loaded into the cache 114. For example, the classloader 106 might determine, based upon the class usage data 112, that certain classes 108 are frequently requested by an application 104. In this scenario, the classloader 106 might pre-load the class 108 into the cache 114 prior to receiving a request for the class 108 from the application 104. As another example, the classloader 106 might determine, based upon the class usage data 112, that two classes are always loaded in a particular order or are dependent upon one another. In this case, the classloader 106 might pre-load the dependent classes 108 prior to receiving a request from the application 104 for the classes 108. It should be appreciated that these examples are merely illustrative and that the classloader 106 might utilize the class usage data 112 to identify classes 108 to be pre-loaded in other ways not specifically identified herein.

In some configurations, the classloader 106 might perform various types of pre-processing on the classes 108 at or around the time they are pre-loaded into the cache 114. For example, and without limitation, bytecode weaving of loaded classes 108 might be performed in conjunction with the pre-loading of the classes 108. Additionally, pre-loaded classes might be defined so the loaded classes 108 are available to requesting applications 104. Pre-processing loaded classes 108 in this manner might also reduce the amount of time required to make a requested class 108 available when requested by an application 104. Other types of pre-processing might also be performed on classes pre-loaded into the cache 114.

In some configurations where the cache 114 is an in-memory cache, the classloader 106 is configured to maintain references 116 to classes 108 that have been pre-loaded into the cache 114. For instance, in the example shown in FIG. 1, the classloader 106 maintains a reference 116 to the class 108A and a reference 116B to the class 108B. In one configuration, the references 116 are weak references. Weak references are references that are not strong enough to keep an object in memory. In a JAVA-based execution environment 102, maintaining weak references 116 to the pre-loaded classes 108 enables a garbage collector (not shown in FIG. 1) to garbage collect pre-loaded classes 108 as needed to reduce memory pressure. It should be appreciated that other types of resource managers might be configured to unload classes and other types of resources in other configurations.

In another configuration, the references 116 to pre-loaded classes are strong references. Strong references are references that are strong enough to keep objects in memory. In this configuration, the classloader 106 performs garbage collection on the in-memory classes 108. In order to enable this functionality, the classloader 106 may maintain time to live ("TTL") values 118 for the classes 108 that have been loaded into memory. For instance, in the example shown in FIG. 1, the class 108A has an associated TTL value 118A and the class 108B has an associated TTL value 118B. The TTL values define the amount of time that a class 108 is to be maintained in memory. After this time has expired, the classloader 106 may unload the class 108 from memory. Additional details regarding a process for using the TTL values 118 to expire pre-loaded classes 108 are provided below with regard to FIG. 5.

It should be appreciated that the mechanisms described herein might be utilized with various types of classloaders 106. For example, and without limitation, when the execution environment 102 is based on a JVM, the mechanisms disclosed herein might be implemented with a bootstrap classloader, an extension classloader, a system classloader, or a tenant classloader. The mechanisms presented herein might also be utilized with other types of classloaders 106 in other configurations. The mechanisms disclosed herein might also be utilized with multiple classloaders 106 executing concurrently in the same execution environment 102. Additional details regarding the mechanisms disclosed herein for pre-loading and pre-processing of classes 108 will be provided below with regard to FIGS. 2-5.

Figure 2:
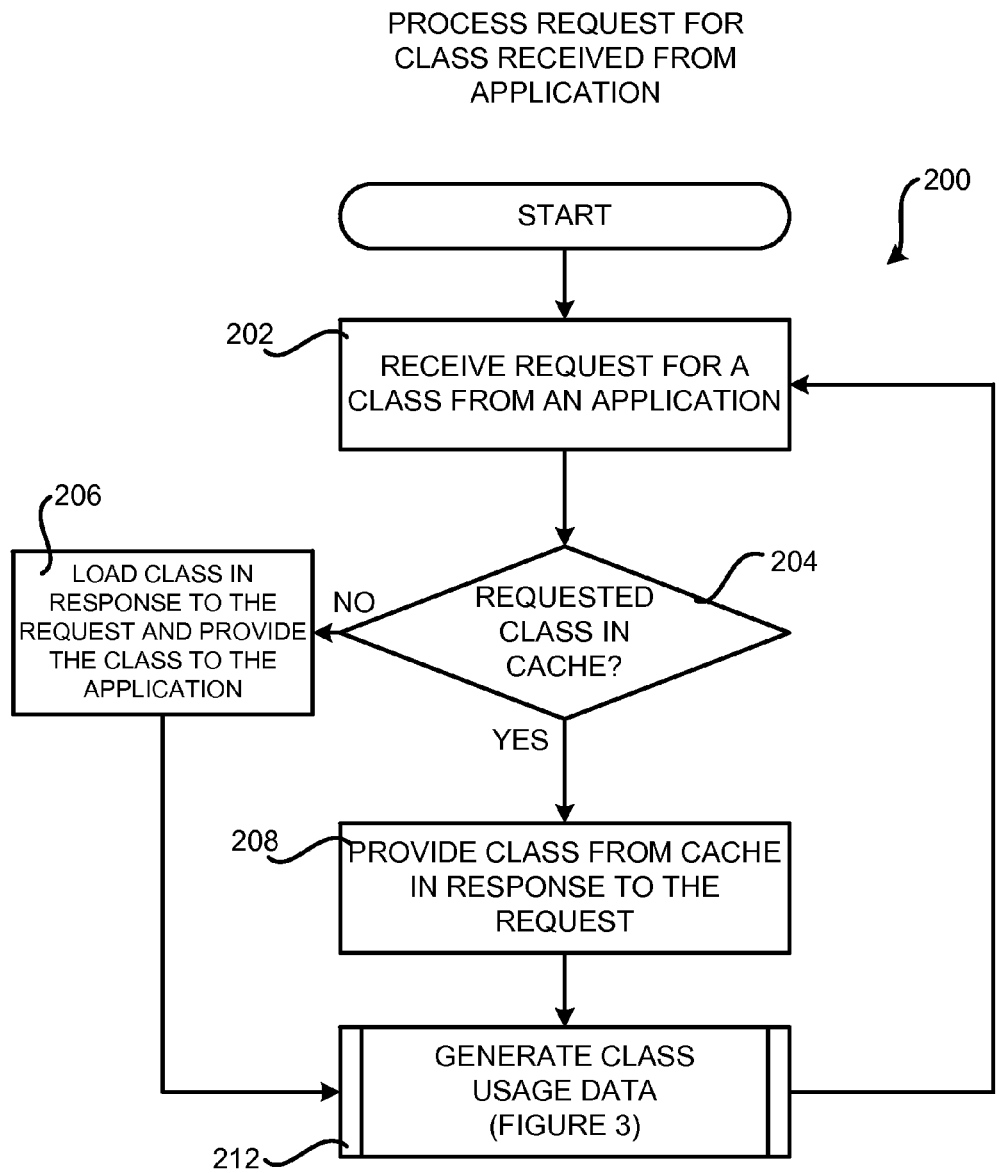
FIG. 2 is a flow diagram showing aspects of one routine disclosed herein for processing a request received from an application for a class in an environment where classes may be pre-loaded.

FIG. 2 is a flow diagram showing aspects of one routine 200 disclosed herein for processing a request received from an application 104 for a class 108 in an execution environment 102 where classes 108 may be pre-loaded, such as that shown in FIG. 1. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where a classloader 106 receives a request from an application 104 for class 108. In response to receiving such a request, the routine 200 proceeds to operation 204, where the classloader 106 determines whether the requested class 108 has been pre-loaded into the cache 114. If the requested class 106 has already been pre-loaded into the cache 114, the routine 200 proceeds from operation 204 to operation 208, where the requested class 108 is provided to the requesting application 104 from the cache 114. In this case, the class 108 has already been pre-loaded from its external location 110 and, potentially, pre-processed in the manner described above. At operation 208, the classloader 106 might also perform bytecode weaving on the requested class 108 and/or other types of processing if not performed previously (e.g. if bytecode weaving was not performed on the requested class 106 at the time it was loaded into the cache 114).

If, at operation 204, the classloader 106 determines that the requested class 106 has not previously been pre-loaded into the cache 114, the routine 200 proceeds from operation 204 to operation 206. At operation 206, the classloader 106 loads the class 110 from its external location 110 and defines the class so that it is available to the application 104. The classloader 106 might also perform other types of processing on the loaded class 108, such as bytecode weaving.

From operations 206 and 208, the routine 200 proceeds to operation 212. At operation 212, the classloader 106 may generate and/or update the class usage data 112 based upon the operations performed at operations 204, 206 and/or 208. For example, and without limitation, the classloader 106 might update the class usage data 112 to reflect the identity of the class 108 that was requested, the frequency at which the requested class 108 has been requested, the computational cost and/or resource cost of loading the requested class 108 at operation 206, and/or to indicate whether the requested class 108 was determined not to be in the cache 114 at operation 204. Additional details regarding the creation and updating of the class usage data 112 will be provided below with regard to FIG. 3. From operation 212, the routine 200 proceeds back to operation 202, where the classloader 106 may process additional requests for classes 108 in the manner described above.

Figure 3:
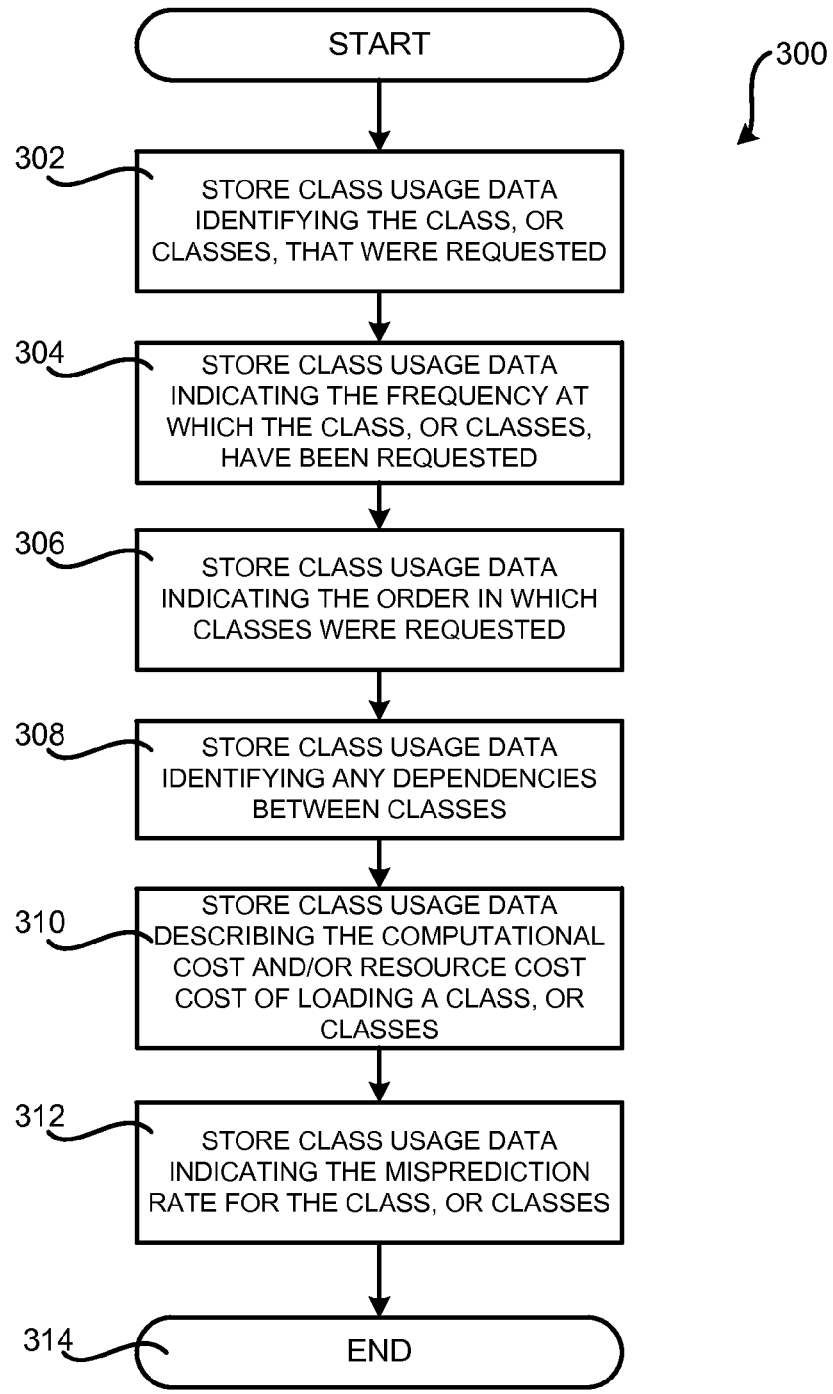
FIG. 3 is a flow diagram showing aspects of one routine disclosed herein for generating class usage data for use in the pre-loading of classes.

FIG. 3 is a flow diagram showing aspects of one routine 300 disclosed herein for generating class usage data 112 for use in the pre-loading of classes 108. As discussed briefly above, the class usage data 112 describes the historical usage of classes 108 by applications 104 executing in an execution environment 102. As also discussed briefly above with regard to FIG. 2, some of the class usage data 112 might be generated in conjunction with the processing of requests for classes 108 received from applications 104 executing in the execution environment 102. The class usage data 112 might also be generated at other times and in response to other conditions in other configurations.

The routine 300 begins at operation 302, where the classloader 106 may store class usage data 112 that identifies the class 108, or classes 108, that were requested by an application 104. From operation 302, the routine 300 proceeds to operation 304, where the classloader 106 stores or updates class usage data 112 that describes the frequency at which the requested class 108, or classes 108, have been requested. Using class usage data 112 that identifies requested classes 108 and the frequency at which they have been historically requested, the classloader 108 can identify those classes 108 that have been historically requested most frequently. The most historically requested classes 108 may then be pre-loaded into the cache 114 in the manner described herein.

From operation 304, the routine 300 proceeds to operation 306, where the classloader 106 may store class usage data 112 indicating the order in which classes 108 were requested. Such order information may be utilized to identify patterns in the manner in which classes 108 are requested. For example, the classloader 106 might determine that a class 108B is frequently requested following a request for a class 108A. In this scenario, the classloader 106 might pre-load the class 108B in the cache 114 immediately following a request for the class 108A even though a request has not yet been received for the class 108B. In a similar fashion, the classloader 106 might store class usage data 112 at operation 308 identifying any dependencies between classes 108. This information might be utilized to pre-load classes 108 that are dependent upon one another. This information might also be utilized to pre-load classes 108 in other ways in other configurations.

From operation 308, the routine 300 proceeds to operation 310, where the classloader 106 might store class usage data 112 describing the computational cost (e.g. the CPU cycles and/or memory required to load the class) and/or the resource cost (e.g. the number of disk I/O operations, network I/O operations, or other types of resource usage used to load the class) of loading a class 108, or classes 108. For example, the classloader 106 might store class usage data 112 describing the performance impact caused by loading a particular class 108. Classes 108 that are larger in size or require certain types of processing might have a larger performance impact, while classes 108 that are smaller in size or that do not require processing might have a lower performance impact. Using this data, the classloader 106 might determine that classes 108 having a larger computation cost or resource cost are not to be pre-loaded into the cache 114 or vice versa. Similarly, the classloader 106 might conclude that there is insufficient benefit to loading classes 108 that have a smaller computational cost or resource cost. This information might also be used in other ways in other configurations.

From operation 310, the routine 300 proceeds to operation 312, where the classloader 106 might store class usage data 112 indicating the cache mis-predication rate for a class 108, or classes 108. As discussed briefly above, a cache miss may occur when the classloader 106 pre-loads a class 108 that is not later requested by an application 104. By storing class usage data 112 identifying classes 108 that were pre-loaded into the cache 114 but not requested by the application 104, the classloader 106 may elect to not pre-load a class 108 into the cache 114 in the future. This data might also be utilized by the classloader 106 in other ways.

From operation 312, the routine 300 proceeds to operation 314, where it ends. It should be appreciated that the example class usage data 112 described above is merely illustrative and that other types of data might also be utilized in order to determine whether a particular class 108 is to be pre-loaded into the cache 114. Additionally, the specific examples of class usage data 112 presented above might also be utilized on other ways not specifically described herein.

Figure 4:
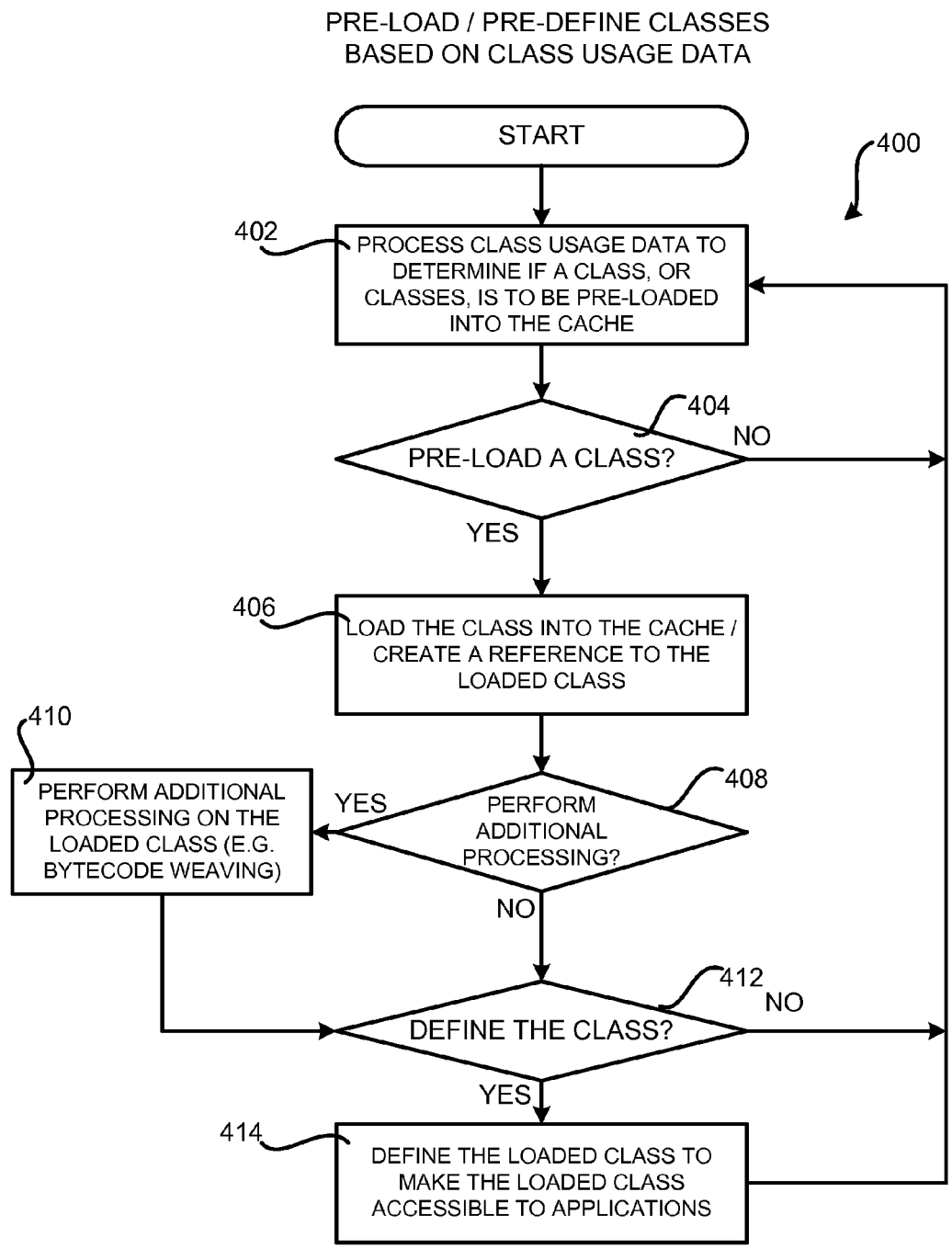
FIG. 4 is a flow diagram showing aspects of one routine disclosed herein for pre-loading classes into a cache based upon class usage data.

FIG. 4 is a flow diagram showing aspects of one routine 400 disclosed herein for pre-loading classes into a cache 114 based upon class usage data. The routine 400 begins at operation 402, where the classloader 106 processes the class usage data 112 to determine if a particular class 108, or classes 108, are to be pre-loaded into the cache 114. As discussed above with regard to FIG. 3, the class usage data 112 might be evaluated in various ways to determine if a particular class 108, or classes 108, are to be pre-loaded.

If the classloader 106 determines that a class 108 is not to be pre-loaded, the routine 400 proceeds from operation 404 back to operation 402, where another such determination may be made. In this way, the class usage data 112 may be continually evaluated in order to determine if a class 108, or classes 108, are to be pre-loaded. If a class 108 is to be pre-loaded, the routine 400 proceeds from operation 404 to operation 406.

At operation 406, the classloader 106 loads the requested class 108 into the cache 114. For example, and as described above, the classloader 106 might load the requested class 108 into RAM when the cache 114 is an in-memory cache. As also discussed above, the classloader 106 might maintain a weak reference 116 to the loaded class 108 so that a garbage collector can collect the loaded class 108. Alternately, the classloader 106 might maintain a strong reference 116 to the loaded class 108 and manage the amount of space utilized by the cache 114 itself. Additional details regarding this process are provided below with regard to FIG. 5.

From operation 406, the routine 400 proceeds to operation 408, where the classloader 106 determines whether any processing is to be performed on the loaded class 108. If processing is to be performed on the loaded class 108, the routine 400 proceeds from operation 408 to operation 410, where processing might be performed on the loaded class 108. For example, and without limitation, the classloader 106 might perform bytecode weaving on the loaded class 108. In particular, the classloader 106 might utilize bytecode weaving in order to modify the requested class 108 at load time to perform certain functionality. Once the processing performed at operation 410 has completed, the routine 400 proceeds from operation 410 to operation 412.

If, at operation 408, the classloader 106 determines that no processing is to be performed on the loaded class 108, the routine 400 proceeds from operation 408 to operation 412. At operation 412, the classloader 106 determines whether the loaded class is to be defined. In some configurations a class 108 is defined at the time it is pre-loaded. In another configuration, a pre-loaded class 108 is not defined until the time the classloader 106 receives a request for the pre-loaded class 108 from an application 104. If the pre-loaded class is not to be defined at the time it is pre-loaded, the routine 400 proceeds from operation 412 back to operation 402, where additional classes 108 might be pre-loaded in the manner described above. If the pre-loaded class 108 is to be defined at the time it is pre-loaded, the routine 400 proceeds from operation 412 to operation 414, where the pre-loaded class 108 is defined. The routine 400 then proceeds from operation 414 to operation 402, where additional classes 108 might be pre-loaded in the manner described above.

Figure 5:
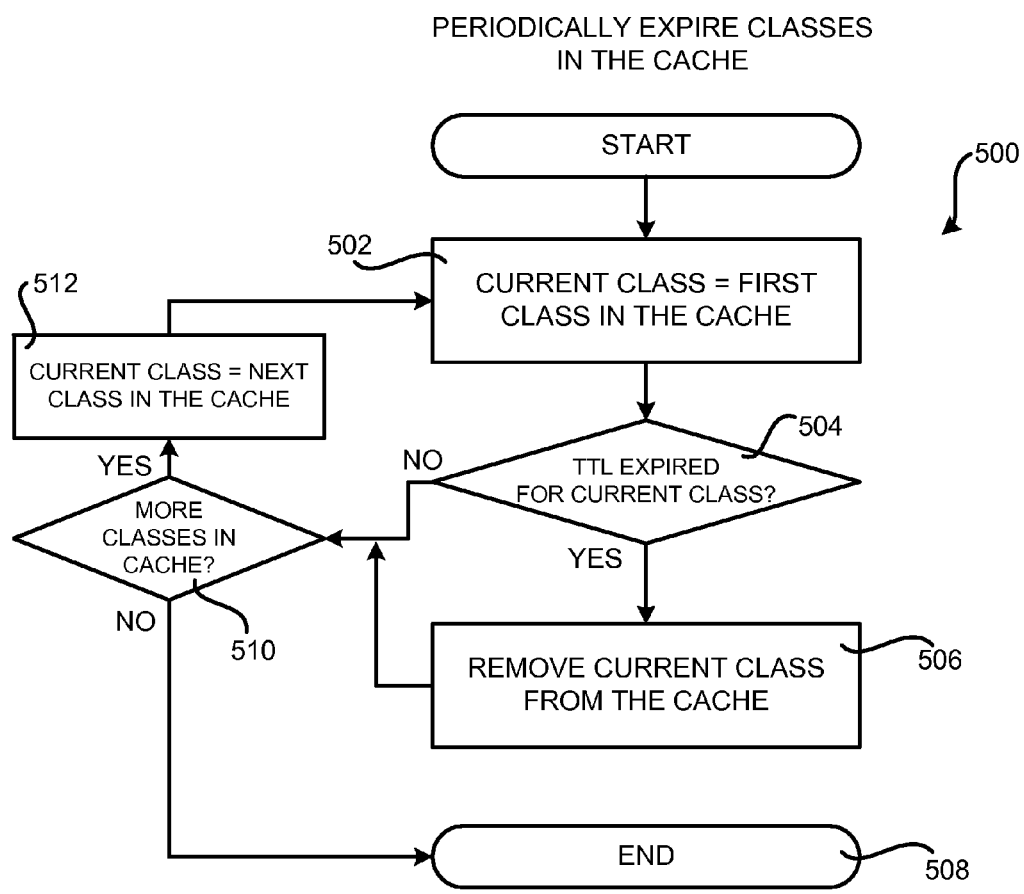
FIG. 5 is a flow diagram showing aspects of one routine disclosed herein for periodically expiring pre-loaded classes in a cache.

FIG. 5 is a flow diagram showing aspects of one routine 500 disclosed herein for periodically expiring pre-loaded classes 108 in a cache. The routine 500 begins at operation 502, where the classloader 106 may initialize a variable to keep track of the class 108 in the cache 114 that is currently being evaluated for expiration. Initially, the first class 108A in the cache 114 is set as the current class 108 that is being evaluated.

From operation 502, the routine 500 proceeds to operation 504, where the classloader 106 determines whether the TTL value 118 associated with the current class 108 being evaluated has expired. For example, the classloader 106 might set the TTL value 118 for a pre-loaded class 108 to 100 ms. If 100 ms has passed since the class 108 was pre-loaded, then the TTL value 118 for the class may be considered to have expired.

If the TTL value 118 for the current class 108 being evaluated has not expired, the routine 500 proceeds from operation 504 to operation 510 where a determination is made as to whether additional classes 108 remain in the cache 114 to evaluate. If additional classes 108 remain to be evaluated, the routine 500 proceeds from operation 510 to operation 512, where the variable storing data identifying the current class 108 being evaluated is incremented to the next class 108 in the cache 114. The routine 500 then proceeds from operation 512 to operation 502. If no additional classes 108 remain to be evaluated, the routine 500 proceeds from operation 510 to operation 508, where it ends.

If, at operation 504, the classloader 106 determines that the TTL value 118 for the current class 108 has expired, the routine 500 proceeds from operation 504 to operation 506. At operation 506, the classloader 106 causes the current class 108 to be removed from the cache 114. For example, and without limitation, if the cache 114 is an in-memory cache, the classloader 106 might remove the strong reference 116 to the current class 108, thereby permitting a garbage collector to garbage collect the current class 108. The routine 500 then proceeds from operation 506 to operation 510, described above. It should be appreciated that the mechanism shown in FIG. 5 for managing the contents of the cache 114 are merely illustrative and that other cache eviction strategies might also be utilized to maintain the size of the cache 114 at a desired level.

Figure 6:
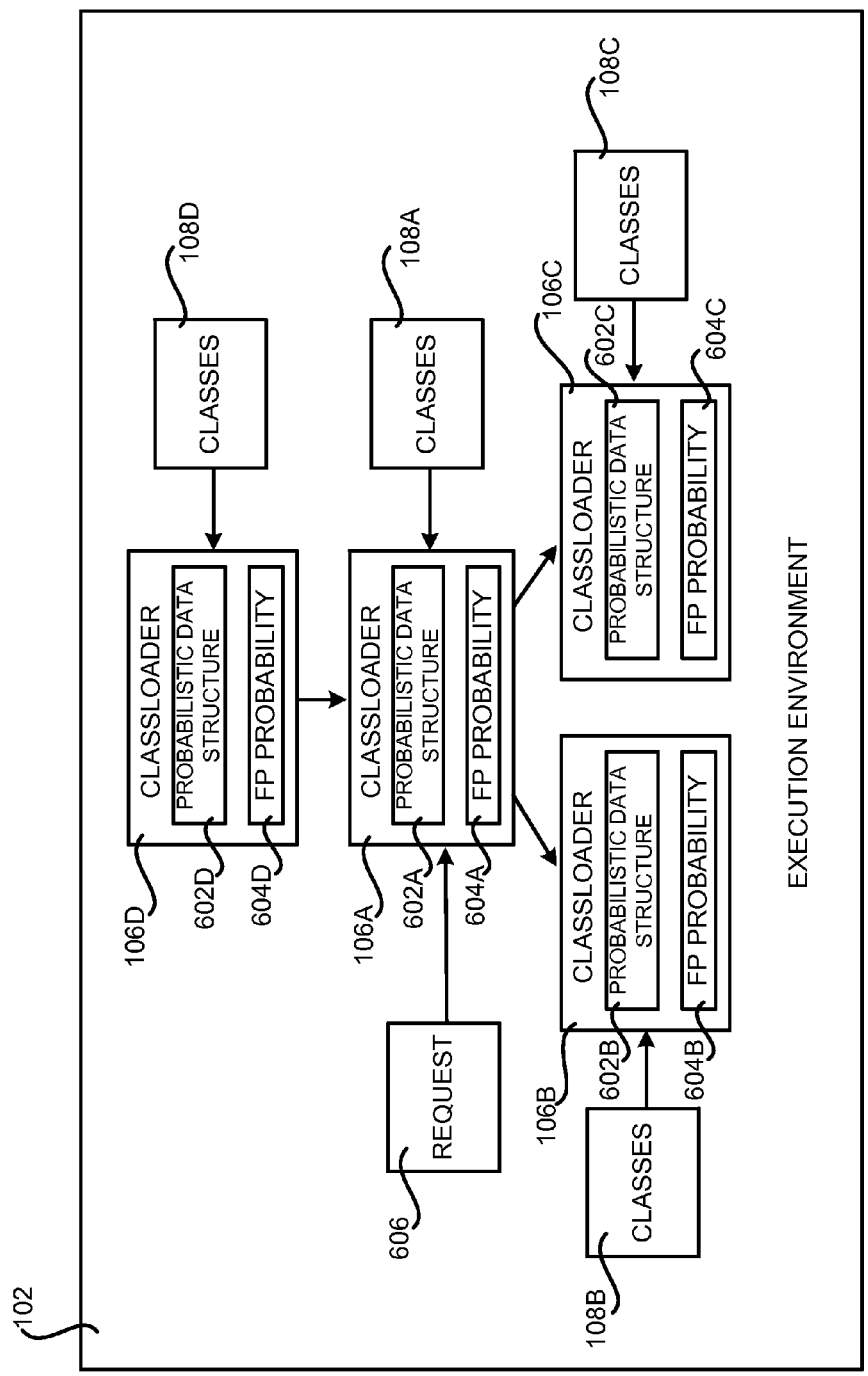
FIG. 6 is a software architecture diagram showing aspects of a mechanism presented herein for optimized loading of classes utilizing a probabilistic data structure.

FIG. 6 is a software architecture diagram showing aspects of a mechanism presented herein for optimized loading of classes 106 utilizing a PDS. As shown in FIG. 6, classloaders 106 might be arranged and utilized in a hierarchical relationship in some configurations. For instance, in the example configuration shown in FIG. 6, the classloader 106A has a parent classloader 106D and two child classloaders 106B and 106C. As also shown in FIG. 6, each classloader 106 might be capable of loading a set of classes 108 that are located in its respective classpath. For instance, in the example shown in FIG. 6, the classloader 106A can load only the classes 108A, the classloader 106B can load only the classes 108B, the classloader 106C can load only the classes 108C, and the classloader 106D can load only the classes 108D.

When a classloader 106A receives a request 606 to load a requested class, the classloader 106A receiving the request 606 will typically search the set of classes located in its own classpath to see if it can load the requested class into memory. If the classloader 106A cannot load the requested class (i.e. the requested class is not part of the set of classes located in the classloader's classpath), the classloader 106A might delegate loading of the requested class to one or more other classloaders 106, such as the classloaders 106B, 106C, or 106D.

Depending upon the particular delegation strategy utilized, the classloader 106A might delegate a request 606 to load a class 108 to the parent classloader 106D (i.e. a "parent first" delegation strategy) or to one or both of the child classloaders 106B and 106C (i.e. a "child first" delegation strategy). Searching a classpath to determine if a requested class 108 can be loaded can, however, be a time consuming operation. Additionally, delegation of a request 606 to one or more other classloaders 106 that also cannot load a requested class 108 might also result in a delay in loading the requested class 108. The mechanisms described below with regard to FIGS. 6 and 7 seek to reduce the effects of these operations.

In an attempt to address the considerations set forth above, and potentially others, a mechanism is provided herein whereby a PDS can be utilized to determine whether there is any probability that a particular classloader 106, or group of classloaders 106, can load a requested class 108. If there is some probability that the classloader can load a requested class, only then is a search made for the requested class 108 in the set of classes in the classpath of the classloader 106. If there is no probability that the classloader 106 can load the requested class, then the request might be delegated to another classloader 106. In some configurations, the request will only be delegated to another classloader 106 that has some possibility of being able to load the requested class 108. These mechanisms might be applied to loaded classes and other types of resources, such as non-class data. Details regarding these mechanisms will be provided below.

As known to those skilled in the art, a PDS is a data structure that can be utilized to test whether an element is a member of a set. Utilizing such a PDS, false positive matches are possible, but false negatives are not. Thus, a PDS has a 100% recall rate. In other words, a query of a PDS returns an indication that an element (e.g. a class) is possibly in the set (e.g. possibly in the classpath associated with a classloader 106) or definitely not in the set (e.g. definitely not in the classpath associated with the classloader 106). Example PDSs include, but are not limited to, Bloom filters, which are space-efficient PDSs, Counting filters, Bloomier filters, Cuckoo filters, Compact approximators, Stable Bloom filters, Scalable Bloom filters, Layered Bloom filters, and Attenuated Bloom filters. Other examples of PDSs will be apparent to those skilled in the art. In this regard, it should be appreciated that while the configurations disclosed herein are presented primarily in the context of a PDS, non-probabilistic data structures might also be utilized in a similar fashion. For example, and without limitation, hash maps might be utilized that indicate the particular classes 108 that each classloader 106 is capable of loading. Other types of data structures might also be utilized.

As shown in FIG. 6, a PDS 602 might be generated for each of the classloaders 106 in a hierarchy of classloaders 106 in one configuration. For instance, in the example shown in FIG. 6, the classloader 106A has an associated PDS 602A, the classloader 106B has an associated PDS 602B, the classloader 106C has an associated PDS 602C, and the classloader 106D has an associated PDS 602D. Each PDS 602 may be generated by searching the classpath associated with each classloader 106 to identify the classes 108 that each classloader 108 is capable of loading. For instance, the PDS 602A might be generated by searching the classpath associated with the classloader 106A to identify the classes 108A that the classloader 106A is capable of loading. The PDS 602 for the other classloaders 106 might be generated in a similar way.

The PDSs 602 might be pre-generated prior to the time requests 606 to load classes 108 are received by the classloaders 106 in one configuration. In another configuration, the PDS 602 are generated lazily in response to receiving requests 606 to load classes. For example, when a request 606 is received at a classloader 106A to load a particular class, the associated classpath may be searched to determine if the requested class 108 can be loaded. The results of this classpath search may be utilized to build the PDS 602. The PDS 602 for each classloader 106 might also be generated at other times. Regardless of the manner in which a PDS 602 is generated, the PDS 602 might be persisted to disk or a network storage system so that the PDS 602 does not have to be regenerated again.

In order to generate a PDS 602, an upper bound on the amount of memory utilized for the PDS 602 may be specified. Alternately, a desired maximum false positive probability 604 might be specified. The false positive probability 604 specifies the maximum probability of false positives that is to be encountered when utilizing a PDS 602. For example, the false positive probability 604A for a PDS 602A might specify that no more than 10% of queries of the PDS 602A indicate that there is some possibility that a class 108 can be loaded by the classloader 106A when, in fact, the classloader 106A cannot actually load the class 108. In general, the lower the false positive probability 604 for a particular FPS 602, the larger the amount of memory used.

Each of the PDSs 602 associated with classloaders 106 in a hierarchy of classloaders 106 may be created using a different false positive probability 604. For instance, classloaders 106 at a higher level in the hierarchy might have a higher false positive probability 604 than classloaders 106 at a lower level in the hierarchy. Additionally, the false positive probability 604 associated with each classloader 106 might be based upon the type of delegation strategy that is utilized. For instance, when a child first delegation strategy is utilized, the parent classloader 106 might have a higher false positive probability 604 that its child classloaders. When a parent first delegation strategy is utilized, a classloader 106 might have a higher false positive probability 604 than its parent classloader 106. Other configurations might also be utilized.

In some configurations, the PDS 602 for a particular classloader 106 might also include data indicating whether there is some probability that a parent or child classloader can load certain classes. For instance, in the example shown in FIG. 6, the classloader 106A might have an associated PDS 602A that indicates whether there any probability that the classloader 106A can load the classes 108A. The PDS 602A might also include data indicating whether there is any probability that the classloader 106B can load the classes 108B and data indicating whether there is any probability that the classloader 106C can load the classes 108C. This data may be utilized by the classloader 106A to delegate requests 606 to load classes to the classloaders 106B or 106C only in the event that there is some possibility that a requested class 108 can be loaded by either the classloader 106B or 106C. In this way, the delegation of requests 606 to portions of the classloader hierarchy that are unable to load a particular class 108 might be avoided.

In some configurations, the class usage data 112 described above is utilized to generate the PDSs 602. For example, and without limitation, class usage data 112 identifying frequently utilized classes 108 might be utilized to generate the PDSs 602. In this way, a determination may be quickly made as to whether a particular classloader 106 is capable of loading the frequently used classes 108. The class usage data 112 might also be utilized in other ways to generate the PDSs 602 in other configurations.

When a classloader 106 receives a request 606 to load a class 108 into memory, the classloader 106 may utilize its associated PDS 602 to determine whether there is any possibility (i.e. a probability greater than zero) that the classloader 106 can load the requested class 108. For instance, in the example shown in FIG. 6, the classloader 106A might receive a request 606 to load a requested class 108 into memory. In response to receiving such a request 606, the classloader 106A may utilize its PDS 602A to determine if there is any probability greater than zero that the requested class 108 is located in the set of classes in its classpath.

If there is some possibility that the classloader 106A can load the requested class 108, it will search the set of classes in its associated classpath for the requested class 108. No search will be made of the classpath if there is no possibility that the classloader 106A can load the requested class 108. The classloader 106A will load the requested class 108 into memory as requested if it locates the requested class 108 in its classpath.

If the PDS 602A indicates that the classloader 106A cannot load the requested class 108, or if the requested class 108 is not found in the classloader's classpath, the classloader 106A might delegate the loading of the requested class 108 to a second classloader that is similarly configured to utilize an associated PDS 602 in the manner described above. For example, when a child first delegation strategy is utilized, the classloader 106A might delegate the request 606 to the classloader 106B or the classloader 106C. When a parent first delegation strategy is utilized, the classloader 106A might delegate the request 606 to the classloader 106D.

As mentioned above, a PDS 602 for a classloader 106 might also be configured to store data for one or more parent or child classloaders 106. For instance, in the example shown in FIG. 6, the PDS 602A for the classloader 106A might also store data for the classloaders 106B, 106C, and/or 106D. In this configuration, the classloader 106A might also be configured to determine based on the contents of the PDS 602A whether to delegate a request 606 to another classloader 106. For example, when a child first delegation scheme is utilized, the classloader 106A might determine, based on the PDS 602A, whether is any possibility that the classloader 106B or 106C can load a requested class 108. If there is no possibility that either the classloader 106B or 106C can load the requested class 108, then the classloader 106A would not delegate the request 606 either of the classloaders 106B and 106C. If there is at least some (i.e. greater than zero) probability that either the classloader 106B or the classloader 106C can load the requested class, then the request 606 will be delegated. A similar mechanism might be utilized to delegate a request 606 to a parent classloader 106 (e.g. the classloader 106D in the example shown in FIG. 6) when a parent first delegation scheme is utilized. Additional details regarding the creation and use of a PDS 602 in optimizing the loading of classes 108 will be provided below with regard to FIG. 7.

Figure 7:
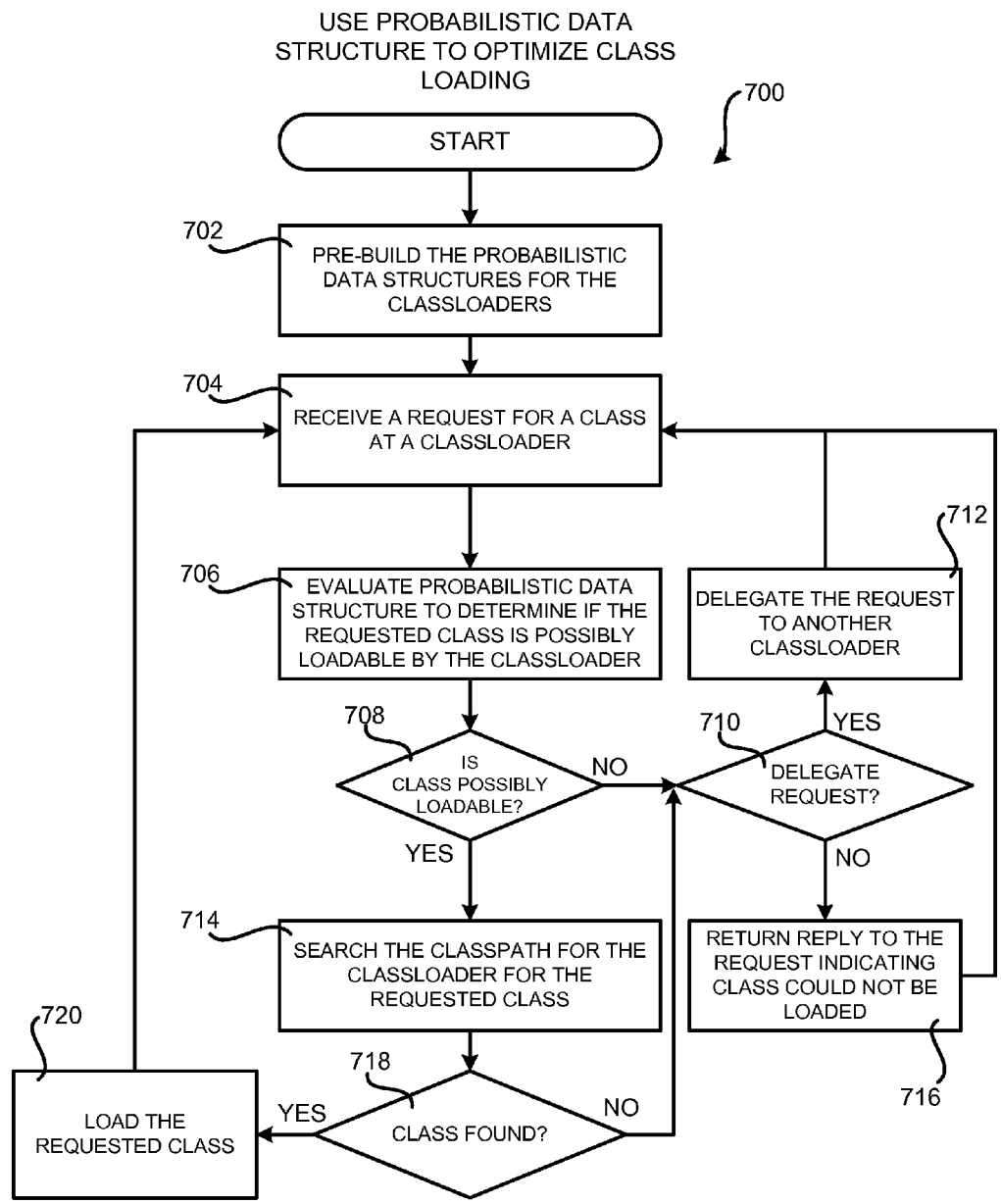
FIG. 7 is a flow diagram showing a routine that illustrates aspects of the operation of the mechanism for optimized loading of classes utilizing a probabilistic data structure shown in FIG. 6.

FIG. 7 is a flow diagram showing a routine 700 that illustrates aspects of the operation of the mechanism for optimized loading of classes 106 utilizing a probabilistic data structure 602 shown in FIG. 6. The routine 700 begins at operation 702, where the PDSs 602 are pre-generated for the classloaders 106 in a hierarchy of classloaders 106, such as that shown in FIG. 6. As discussed above, the PDSs 602 might be pre-generated prior to receiving requests 606 to load classes or, in another configuration, the PDSs 602 might be generated based upon received requests 606. Other mechanisms might also be utilized to generate the PDSs 606.

From operation 702, the routine 700 proceeds to operation 704, where a classloader 106 receives a request 606 to load a requested class 108. For instance, in the example shown in FIG. 6, the classloader 106A has received a request 606 to load a requested class 108. In response to receiving a request 606 to load a class 108, the routine 700 proceeds from operation 704 to operation 706, where the classloader 106 receiving the request 606 evaluates its associated PDS 602 to determine if there is any possibility that the classloader 106 can load the requested class 108. As discussed above, the PDS 602 includes data indicating whether the classloader 106 cannot load certain classes 108 and data indicating that there is at least some possibility that the classloader can 106 load certain other classes 108.

If there is some possibility that the classloader 106 can load the requested class 108, the routine 700 proceeds from operation 708 to operation 714. At operation 714, the classloader 106 searches its respective classpath for the requested class 108. If the search of the classpath successfully locates the requested class 108, the routine 700 proceeds from operation 718 to operation 720, where the requested class 108 is loaded into memory. The routine 700 then proceeds from operation 720 to operation 704, where another request 606 to load a class 108 might be processed in a similar manner.

If, at operation 718, the classloader 106 determines that the requested class 108 could not be found in the associated classpath, the routine 700 proceeds from operation 718 to operation 710. Similarly, if the classloader 106 determines at operation 708, based on its associated PDS 602, that the requested class 606 is not loadable by the classloader 106, the routine 700 proceeds from operation 708 to operation 710.

At operation 710, the classloader 106 determines whether the request 606 is to be delegated to another classloader 106. As discussed above, various types of delegation policies might be specified when a hierarchy of classloaders 106 is utilized. If no delegation of requests 606 is to be made, the routine 700 proceeds from operation 710 to operation 716, where a response may be returned to the request received at operation 704 indicating that the requested class 108 could not be loaded. If, however, the request 606 is to be delegated, the routine 700 may proceed to operation 712.

At operation 712, the request 606 may be delegated to another classloader 106 for processing. As discussed above, for example, the request 606 might be delegated to one or more child classloaders 106 or to a parent classloader 106 depending upon the particular delegation policy that is utilized. Additionally, and as also discussed above, the determination as to whether a request 606 is to be delegated might also be made utilizing a PDS 602 that includes data indicating whether there is some possibility that a parent or child classloader 106 can load a requested class 108. If there is some possibility that a parent or child classloader 106 can load a requested class 108, then the request 606 might be delegated to the parent or child classloader 106. If there is no possibility that that the parent or child classloader 106 can load the requested class 108, then the request 606 will not be delegated. From operation 712, the routine 700 proceeds back to operation 704, where another request 606 to load a class 108 might be processed in the manner described above with regard to FIGS. 6 and 7.

Figure 8:
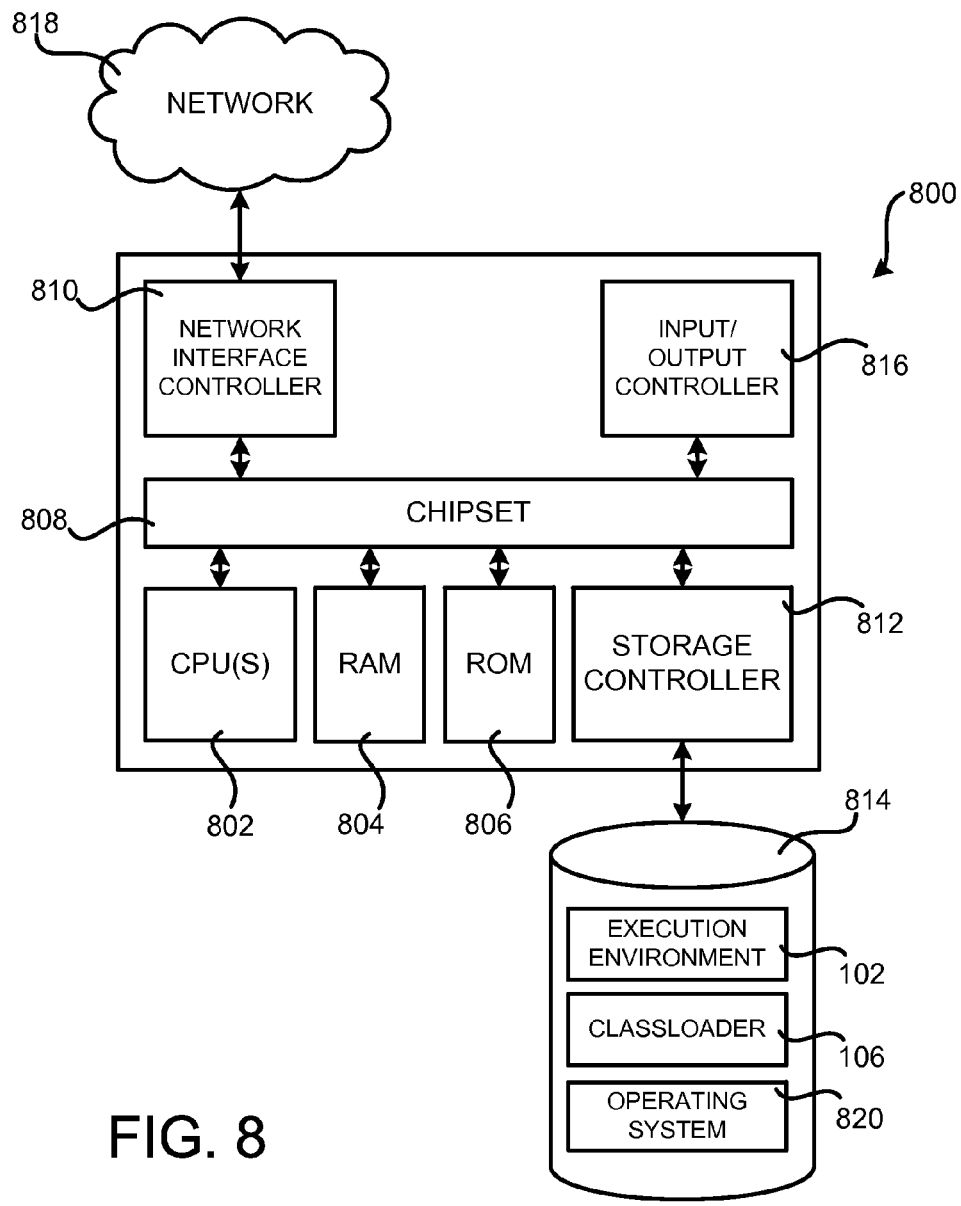
FIG. 8 is a computer architecture diagram showing an illustrative computer hardware architecture for computing devices described in various configurations presented herein.

FIG. 8 shows an example computer architecture for a computer 800 capable of executing the software components described herein for optimized class loading. The computer architecture shown in FIG. 8 illustrates a conventional server computer, workstation, desktop computer, laptop, network appliance, tablet computing device, electronic book reader, digital cellular phone, or other computing device, and may be utilized to execute any aspects of the software components presented herein. For example, and without limitation, the computer architecture shown in FIG. 8 might be utilized to implement computer systems that execute one or more software components for implementing the functionality described above. Other types of hardware architectures might also be utilized.

The computer 800 includes a baseboard, or "motherboard," which is a printed circuit board to which a multitude of components or devices may be connected by way of a system bus or other electrical communication paths. In one illustrative configuration, one or more central processing units ("CPUs") 802 operate in conjunction with a chipset 808. The CPUs 802 are standard programmable processors that perform arithmetic and logical operations necessary for the operation of the computer 800.

The CPUs 802 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 808 provides an interface between the CPUs 802 and the remainder of the components and devices on the baseboard. The chipset 808 may provide an interface to a random access memory ("RAM") 804, used as the main memory in the computer 800. The chipset 808 may further provide an interface to a computer-readable storage medium such as a read-only memory ("ROM") 806 or non-volatile RAM ("NVRAM") for storing basic routines that help to startup the computer 800 and to transfer information between the various components and devices. The ROM 806 or NVRAM may also store other software components necessary for the operation of the computer 800 in accordance with the various configurations described herein.

According to various configurations, the computer 800 may operate in a networked environment using logical connections to remote computing devices and computer systems through the network 818, such as a LAN, a WAN, the Internet, or any other networking topology known in the art that connects the computer 800 to remote computers. The chipset 808 includes functionality for providing network connectivity through a network interface controller ("NIC") 810, such as a gigabit Ethernet adapter. The NIC 810 is capable of connecting the computer 800 to other computing devices over the network 818. It should be appreciated that multiple NICs 810 may be present in the computer 800, connecting the computer 800 to various types of networks and remote computer systems.

The computer 800 may be connected to a mass storage device 814 that provides non-volatile storage for the computer 800. The mass storage device 814 may store system programs, application programs, other program modules, and data, which are described in greater detail herein. The mass storage device 814 may be connected to the computer 800 through a storage controller 812 connected to the chipset 808. The mass storage device 814 may consist of one or more physical storage units. The storage controller 812 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 800 may store data on the mass storage device 814 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 814 is characterized as primary or secondary storage, and the like. For example, the computer 800 may store information to the mass storage device 814 by issuing instructions through the storage controller 812 to alter the magnetic characteristics of a particular location within a magnetic disk drive unit, the reflective or refractive characteristics of a particular location in an optical storage disk, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 814 by detecting the physical states or characteristics of one or more particular locations within the physical storage units.

In addition to the mass storage device 814 described above, the computer 800 may have access to other computer-readable storage media to store and retrieve information, such as program modules, data structures, or other data. It should be appreciated by those skilled in the art that computer-readable storage media can be any available non-transitory media that may be accessed by the computer 800. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 814 may store an operating system 820 utilized to control the operation of the computer 800. In one configuration, the operating system comprises the LINUX operating system. In another configuration, the operating system comprises the WINDOWS® SERVER operating system from MICROSOFT Corporation of Redmond, Wash. In yet other configurations, the operating system may comprise the UNIX operating system. It should be appreciated that other operating systems may also be utilized. The mass storage device 814 may store other system or application programs and data utilized by the computer 800. For example, the mass storage device 814 may store the execution environment 102 and one or more classloaders 106, both of which were described above. The mass storage device 814 might also store other programs and data not specifically identified herein.

In one configuration, the mass storage device 814 or other computer-readable storage media may be encoded with computer-executable instructions that, when loaded into the computer 800, may transform the computer from a general-purpose computing system into a special-purpose computer capable of implementing the technologies described herein. These computer-executable instructions transform the computer 800 by specifying how the CPUs 802 transition between states, as described above. In one configuration, the computer 800 has access to computer-readable storage media, such as an optical disk, a solid-state storage device, or a magnetic storage device, storing computer-executable instructions that, when executed by the computer 800, perform the various routine described above with regard to FIGS. 2-5 and 7.

The computer 800 might also include an input/output controller 816 for receiving and processing input from a number of input devices, such as a keyboard, a mouse, a touchpad, a touch screen, an electronic stylus, and/or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that various concepts and technologies for optimized loading of classes have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The disclosed presented herein also encompasses the subject matter set forth in the following clauses:

Clause 1: A non-transitory computer-readable storage medium having computer-executable instructions stored thereupon which, when executed by a computer, cause the computer to: store class usage data describing historical usage of one or more classes by one or more tenants of a software container executing on the computer; pre-load one or more of the classes into a cache in a memory of the computer based upon the class usage data; receive, at a classloader executing in the software container, a request from one of the one or more tenants for a requested class; and provide the requested class in response to the request from the cache if the requested class is stored in the cache.

Clause 2: The non-transitory computer-readable storage medium of clause 1, wherein the classloader is configured to maintain weak references to classes in the cache.

Clause 3: The non-transitory computer-readable storage medium of clauses 1 and 2, wherein the classloader is configured to maintain strong references to classes in the cache and to remove classes from the cache after an associated time to live has expired.

Clause 4: The non-transitory computer-readable storage medium of clauses 1-3, wherein the class usage data comprises one or more of: data identifying the one or more classes; data identifying a frequency at which the one or more classes were requested; data identifying an order in which the one or more classes were requested; data identifying one or more dependencies between the one or more classes; a computational cost or resource cost of loading the one or more classes; or data indicating a mis-prediction rate for the one or more classes.

Clause 5: The non-transitory computer-readable storage medium of clauses 1-4, wherein the classloader comprises a bootstrap classloader, an extension classloader, a system classloader, or a tenant classloader.

Clause 6: An apparatus configured to pre-load classes, the apparatus comprising: a processor; a memory; and a computer-readable storage medium having computer-executable instructions stored thereupon which, when executed by the processor, cause the apparatus to load one or more classes into a cache based upon class usage data that describes historical usage of the one or more classes by one or more applications executing in an execution environment, receive a request at a classloader executing in the execution environment from one of the one or more applications for a requested class, and provide the requested class from the cache in response to the request if the requested class is stored in the memory.

Clause 7: The apparatus of clause 6, wherein the execution environment comprises a JAVA virtual machine (JVM).

Clause 8: The apparatus of clauses 6 and 7, wherein the execution environment comprises a software container.

Clause 9: The apparatus of clauses 6-8, wherein the classloader is configured to: load the one or more classes into the cache based upon the class usage data; and maintain weak references to the one or more classes in the cache so that the classes in the cache may be unloaded by a resource manager.

Clause 10: The apparatus of clauses 6-9, wherein the classloader is configured to: load the one or more classes into the cache based upon the class usage data; maintain strong references to the one or more classes loaded into the cache; and utilize a cache eviction strategy to remove one or more classes from the cache.

Clause 11: The apparatus of clauses 6-10, wherein the classloader is further configured to perform bytecode weaving on the one or more classes when the one or more classes are loaded into the cache.

Clause 12: The apparatus of clauses 6-11, wherein the classloader is further configured to define the classes when the one or more classes are loaded into the cache.

Clause 13: The apparatus of clauses 6-12, wherein the class usage data comprises one or more of: data identifying the one or more classes; data identifying a frequency at which the one or more classes were requested; data identifying an order in which the one or more classes were requested; data identifying one or more dependencies between the one or more classes; a computational cost or resource cost of loading the one or more classes; or data indicating a mis-prediction rate for the one or more classes.

Clause 14: The apparatus of clauses 6-13, wherein the classloader comprises a bootstrap classloader, an extension classloader, a system classloader, or a tenant classloader.

Clause 15: A computer-implemented method for preloading classes, the method comprising: loading one or more classes into a cache based upon class usage data describing usage of the one or more classes by one or more applications executing in an execution environment on the computer; receiving a request for a requested class at a classloader executing in the execution environment; and making the requested class available from the cache in response to the request if the requested class is stored in the memory.

Clause 16: The computer-implemented method of clause 15, wherein the class usage data comprises one or more of: data identifying the one or more classes; data identifying a frequency at which the one or more classes were requested; data identifying an order in which the one or more classes were requested; data identifying one or more dependencies between the one or more classes; a computational cost or resource cost of loading the one or more classes; or data indicating a mis-prediction rate for the one or more classes.

Clause 17: The computer-implemented method of clauses 15 and 16, wherein the classloader is configured to: load the one or more classes into the cache based upon the class usage data; and maintain weak references to the one or more classes in the cache, whereby the classes in the cache can be unloaded by a resource manager.

Clause 18: The computer-implemented method of clauses 15-17, wherein the classloader is configured to: load the one or more classes into the cache based upon the class usage data; maintain strong references to the one or more classes loaded into the cache; and remove one or more classes from the cache based upon a cache eviction strategy.

Clause 19: The computer-implemented method of clauses 15-18, wherein the classloader comprises a bootstrap classloader, an extension classloader, a system classloader, or a tenant classloader.

Clause 20: The computer-implemented method of clauses 15-19, wherein the execution environment comprises a software container or a JAVA virtual machine (JVM).

Clause 21: A non-transitory computer-readable storage medium having computer-executable instructions stored thereupon which, when executed by a computer, cause the computer to: maintain a Bloom filter associated with a classloader, the Bloom filter comprising data indicating that the classloader cannot load a set of classes and that the classloader can possibly load a second set of classes; receive a request at the classloader to load a requested class; determine, based at least in part on the Bloom filter, that the classloader can possibly load the requested class; search a classpath associated with the classloader for the requested class only if the classloader can possibly load the requested class; and load the requested class into a memory of the computer if the requested class is found in the classpath.

Clause 22: The non-transitory computer-readable storage medium of clause 21, having further computer-executable instructions stored thereupon that cause the computer to: determine, based at least in part on the Bloom filter, that the classloader cannot load the requested class; determine if the request to load the requested class is to be delegated to a second classloader; and delegate the request to load the requested class to the second classloader if the request to load the requested class is to be delegated, the second classloader having a second Bloom filter associated therewith.

Clause 23: The non-transitory computer-readable storage medium of clauses 21 and 22, wherein the Bloom filter has an associated false positive probability, wherein the second Bloom filter has an associated second false positive probability, and wherein the false positive probability is greater than or less than the second false positive probability.

Clause 24: The non-transitory computer-readable storage medium of clauses 21-23, wherein the Bloom filter is created prior to receiving the request to load the requested class.

Clause 25: The non-transitory computer-readable storage medium of clauses 21-24, wherein the Bloom filter is created based, at least in part, upon the request to load the requested class.

Clause 26: An apparatus configured to load one or more classes, the apparatus comprising: a processor; a memory; and a computer-readable storage medium having computer-executable instructions stored thereupon which, when executed by the processor, cause the apparatus to maintain a probabilistic data structure associated with a classloader in the memory, the probabilistic data structure comprising data indicating that the classloader cannot load a first set of resources and that the classloader can possibly load a second set of resources, receive a request to load a requested resource into the memory, determine, based on the probabilistic data structure, whether the classloader can possibly load the requested resource, and search a classpath associated with the classloader for the requested resource in response to determining that the classloader can possibly load the requested resource.

Clause 27: The apparatus of clause 26, wherein the probabilistic data structure comprises a Bloom filter.

Clause 28: The apparatus of clauses 26 and 27, wherein the computer-readable storage medium has further computer-executable instructions stored thereupon to cause the apparatus to delegate the request to load the requested resource to a second classloader or return a response to the request indicating that the requested resource could not be loaded in response to determining, based on the probabilistic data structure, that the classloader cannot possibly load the requested resource.

Clause 29: The apparatus of clauses 26-28, wherein the computer-readable storage medium has further computer-executable instructions stored thereupon to cause the apparatus to delegate the request to load the requested resource to a second classloader or return a response to the request indicating that the requested resource could not be loaded in response to determining that the requested resource was not found in the classpath associated with the classloader.

Clause 30: The apparatus of clauses 26-29, wherein the request to load the requested resource is delegated to a second classloader, wherein the second classloader has an associated probabilistic data structure, wherein the probabilistic data structure has an associated false positive probability, wherein the second probabilistic data structure has an associated second false positive probability, and wherein the false positive probability is greater than or less than the second false positive probability.

Clause 31: The apparatus of clauses 26-30, wherein the probabilistic data structure is created prior to receiving the request to load the requested resource.

Clause 32: The apparatus of clauses 26-31, wherein the probabilistic data structure is created based, at least in part, upon the request to load the requested resource.

Clause 33: The apparatus of clauses 26-32, wherein the probabilistic data structure further comprises data indicating that one or more parent classloaders and one or more child classloaders cannot load the second set of resources and that the one or more parent classloaders and the one or more child classloaders can possibly load the first set of resources.

Clause 34: The apparatus of clauses 26-33, wherein the request is delegated to one of the one or more parent classloaders or one of the one or more child classloaders in response to determining that the one of the one or more parent classloaders or the one of the one or more child classloaders can possibly load the requested resource.

Clause 35: A computer-implemented method for loading one or more classes, the method comprising: receiving a request at a classloader to load a requested resource into a memory of a computer; and searching a classpath associated with the classloader for the requested resource only if a probabilistic data structure indicates that there is a possibility that the classloader can load the requested resource, the probabilistic data structure comprising data indicating that the classloader cannot load a first set of resources and data indicating that there is a possibility that the classloader can load a second set of resources.

Clause 36: The computer-implemented method of clause 35, further comprising loading the requested resource into the memory of the computer in response to determining that the requested resource was found during the search of the classpath associated with the classloader.

Clause 37: The computer-implemented method of clauses 35 and 36, wherein the probabilistic data structure comprises a Bloom filter.

Clause 38: The computer-implemented method of clauses 35-37, wherein the probabilistic data structure is created prior to receiving the request to load the requested resource.

Clause 39: The computer-implemented method of clauses 35-38, further comprising: delegating the request to a second classloader in response to determining that the classloader cannot possibly load the requested resource, wherein the second classloader has an associated second probabilistic data structure, wherein the probabilistic data structure has an associated false positive probability, and wherein the second probabilistic data structure has an associated second false positive probability that is less than the false positive probability.

Clause 40: The computer-implemented method of clauses 35-39, wherein the probabilistic data structure further comprises data indicating that one or more parent classloaders and one or more child classloaders cannot load the first set of resources and that the one or more parent classloaders and the one or more child classloaders can possibly load the second set of resources, and wherein the request is delegated to one of the one or more parent classloaders or one of the one or more child classloaders based on the probabilistic data structure.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
maintain a Bloom filter associated with a classloader, the Bloom filter comprising first data indicating that a classpath of the classloader does not include a first set of classes, and second data indicating that the classpath of the classloader possibly includes a second set of classes, the second data indicating a false positive probability that the classpath of the classloader includes the second set of classes;
receive a request at the classloader to load a first requested class;
determine, based at least in part on the Bloom filter, that the first requested class is in the second set of classes;
in response to determining that the first requested class is in the second set of classes, search the classpath associated with the classloader for the first requested class;
determine, based at least in part on the search, that the first requested class is in the classpath;
load the first requested class into a memory of the computer;
determine, based at least in part on the Bloom filter, that a second requested class is in the first set of classes;
determine that a second request to load the second requested class is to be delegated to a second classloader; and
delegate the second request to load the second requested class to the second classloader, the second classloader having a second Bloom filter.

2. The non-transitory computer-readable storage medium of claim 1, wherein the second Bloom filter has an associated second false positive probability, and wherein the false positive probability is greater than or less than the second false positive probability.

3. The non-transitory computer-readable storage medium of claim 1, wherein the Bloom filter is created prior to receiving the first request to load the first requested class.

4. The non-transitory computer-readable storage medium of claim 1, wherein the Bloom filter is created based, at least in part, upon the first request to load the first requested class.

5. An apparatus configured to load one or more classes, the apparatus comprising:
a processor;
a memory; and
a computer-readable storage medium having computer-executable instructions stored thereupon which, when executed by the processor, cause the apparatus to:
maintain a probabilistic data structure associated with a classloader in the memory, the probabilistic data structure comprising first data indicating that a classpath of the classloader does not include a first set of resources, and second data indicating that the classpath of the classloader possibly includes a second set of resources, the second data indicating a false positive probability that the classpath of the classloader includes the second set of resources, receive a first request to load a first requested resource into the memory, determine, based on the probabilistic data structure, that the first requested resource is in the second set of resources, in response to determining that the first requested resource is in the second set of resources, search the classpath associated with the classloader for the first requested resource, determine, based at least in part on the search, that the first requested resource is in the classpath;

determine, based at least in part on the probabilistic data structure, that a second requested resource is in the first set of resources, determine that a second request to load the second requested resource is to be delegated to a second classloader, and delegate the second request to load the second requested resource to the second classloader, the second classloader having a second probabilistic data structure.

6. The apparatus of claim 5, wherein the probabilistic data structure comprises a Bloom filter.

7. The apparatus of claim 5, wherein the computer-readable storage medium has further computer-executable instructions stored thereupon to cause the apparatus to delegate a third request to load a third requested resource to a second classloader or return a response to the third request indicating that the third requested resource could not be loaded in response to determining that the third requested resource was not found in the classpath associated with the classloader.

8. The apparatus of claim 5, wherein the second probabilistic data structure has an associated second false positive probability, and wherein the false positive probability is greater than or less than the second false positive probability.

9. The apparatus of claim 5, wherein the probabilistic data structure is created prior to receiving the first request to load the first requested resource.

10. The apparatus of claim 5, wherein the probabilistic data structure is created based, at least in part, upon the first request to load the first requested resource.

11. The apparatus of claim 5, wherein the probabilistic data structure further comprises data indicating that one or more classpaths associated with one or more parent classloaders and one or more child classloaders do not include the second set of resources, and that the one or more classpaths associated with the one or more parent classloaders and the one or more child classloaders possibly include the first set of resources.

12. The apparatus of claim 11, wherein the first request is delegated to one of the one or more parent classloaders or one of the one or more child classloaders in response to determining that the one of the one or more parent classloaders or the one of the one or more child classloaders possibly include the first requested resource.

13. A computer-implemented method for loading one or more classes, the method comprising:

receiving a first request at a classloader to load a first requested resource into a memory of a computer;

determining, based at least in part on a probabilistic data structure, that a classpath associated with the classloader possibly includes the first requested resource, the probabilistic data structure comprising first data indicating that the classpath does not include a first set of resources, and second data indicating that the classpath possibly includes a second set of resources including the requested resource, the second data indicating a false positive probability that the classpath of the classloader includes the second set of resources;

in response to the determining, searching the classpath for the first requested resource;

determining, based at least in part on the searching, that the first requested resource is in the classpath;

determining, based at least in part on the probabilistic data structure, that a second requested resource is in the first set of resources, determining that a second request to load the second requested resource is to be delegated to a second classloader, and delegating the request to load the second requested resource to the second classloader, the second classloader having a second probabilistic data structure.

14. The computer-implemented method of claim 13, further comprising loading the first requested resource into the memory of the computer in response to determining that the first requested resource was found during the searching of the classpath associated with the classloader.

15. The computer-implemented method of claim 13, wherein the probabilistic data structure comprises a Bloom filter.

16. The computer-implemented method of claim 13, wherein the probabilistic data structure is created prior to receiving the first request to load the first requested resource.

17. The computer-implemented method of claim 13, wherein the second probabilistic data structure has an associated second false positive probability that is less than the false positive probability.

18. The computer-implemented method of claim 13, wherein the probabilistic data structure further comprises data indicating that one or more classpaths associated with one or more parent classloaders and one or more child classloaders possibly include the first set of resources, and that the one or more classpaths associated with the one or more parent classloaders and the one or more child classloaders do not include the second set of resources, and wherein the first request is delegated to one of the one or more parent classloaders or one of the one or more child classloaders based on the probabilistic data structure.

* * * * *